United States Patent [19]

Jain

[11] Patent Number: 5,157,593
[45] Date of Patent: Oct. 20, 1992

[54] CONSTANT FREQUENCY RESONANT DC/DC CONVERTER

[75] Inventor: Praveen K. Jain, Kanata, Canada

[73] Assignee: Northern Telecom Limited, Montreal, Canada

[21] Appl. No.: 676,597

[22] Filed: Mar. 28, 1991

Related U.S. Application Data

[63] Continuation-in-part of Ser. No. 627,157, Dec. 13, 1990.

[51] Int. Cl.$^5$ .......................................... H02M 3/335
[52] U.S. Cl. .................................. 363/17; 363/98; 363/132
[58] Field of Search .......................... 363/17, 98, 132

[56] References Cited

U.S. PATENT DOCUMENTS

| | | | |
|---|---|---|---|
| 4,355,243 | 10/1982 | Tellert | 363/131 |
| 4,679,129 | 6/1987 | Sakakibara et al. | 363/17 |
| 4,706,252 | 11/1987 | Egawa et al. | 363/136 |
| 4,796,173 | 1/1989 | Steigerwald | 363/133 |
| 4,814,962 | 3/1989 | Magalhaes et al. | 363/17 |
| 4,825,348 | 4/1989 | Steigerwald et al. | 363/17 |
| 4,833,584 | 5/1989 | Divan | 363/98 |
| 4,857,822 | 8/1989 | Tabisz et al. | 363/16 |
| 4,876,635 | 10/1989 | Park et al. | 363/17 |
| 4,935,857 | 6/1990 | Nguyen et al. | 363/132 |
| 4,992,919 | 2/1991 | Lee et al. | 363/132 |

OTHER PUBLICATIONS

Steigerwald; "Comparison of Half-Bridge Resonant Converter Topologies", Apr. 1988 IEEE; pp. 173-182.

*Primary Examiner*—Steven L. Stephan
*Assistant Examiner*—Jeffrey Sterrett
*Attorney, Agent, or Firm*—Yoshiharu Toyooka

[57] ABSTRACT

A constant frequency full resonant mode dc/dc converter is provided, suitable for use in low voltage, high current dc power distribution systems. The converter comprises a full-bridge inverter, a resonant circuit, an output transformer, an output diode rectifier, a dc output filter, and a control circuit. The resonant circuit consists of a series branch and a parallel branch. The components of the resonant circuit are selected such that a sinusoidal voltage waveform is achieved across the parallel branch, and an overall lagging current is obtained at the output of the full-bridge inverter for a desired range of output voltage control and no-load to full-load operating conditions.

4 Claims, 7 Drawing Sheets

CONSTANT FREQUENCY RESONANT DC/DC CONVERTER

FIELD OF THE INVENTION

This is a continuation-in-part of U.S. Pat. application Ser. No. 627,157, filed on Dec. 13, 1990. The invention generally relates to resonant dc/dc converters. More specifically, it is directed to pulse width modulation (PWM) resonant mode dc/dc converters with constant and very high operating frequency.

BACKGROUND OF THE INVENTION

In many advanced telecommunication systems, for example, such as Fiber World Products, high performance dc/dc power converters with low voltage, high current output are required. Some of the basic requirements for these power converters are:
 a) high efficiency;
 b) high power density;
 c) high reliability;
 d) fast dynamic response;
 e) low mass density;
 f) low EMI (both conducted and radiated);
 g) regulated output dc voltage with low ripple;
 h) constant frequency operation.

It is believed that the above features of the converters will significantly enhance overall performance of the system. Consequently, there is likely to be a trend toward use of such converters in the future.

Various topologies of half-bridge resonant converters are studied and compared in IEEE Trans. on Power Electronics, Vol. 3, No. 2, Apr. 1988, pp. 174–182 "A Comparison of Half-Bridge Resonant Converter Topologies" by R. Steigerwald. A half-bridge inverter is coupled with a series, a parallel or a series-parallel resonant circuit and their performances are compared.

In an article by the present inventor, "Performance Comparison of Pulse Width Modulated Resonant Mode dc/dc Converters for Space Applications", IEEE Industry Applications Society Conference Record, Oct. 1989, pp. 1106–1114, full-bridge resonant converters are described.

PWM series-parallel resonant converters are further studied in "Fixed Frequency PWM Series-Parallel Resonant Converter", by A.K.S. Bhat, IEEE Industry Applications Society Conference Record, Oct. 1989, pp. 1115–1121.

U.S. Pat. No. 4,857,822, issued Aug. 15, 1989 in the name of Tabisz et al, describes a zero-voltage-switched multi-resonant converter in which a multi-resonant switch forms three different resonant circuits for improved performance at higher frequencies.

U.S. Pat. No. 4,833,584, issued May 23, 1989 in the name of Divan, on the other hand, teaches a high frequency quasi-resonant current mode static power converter in which the output voltage is controlled by varying the operating frequency. It is therefore not suitable for the application where frequency locking/synchronization is required.

In the above articles, parallel resonant and series-parallel resonant circuits contain only parallel capacitors as their parallel resonant component.

OBJECTS OF THE INVENTION

It is therefore an object of the present invention to provide resonant dc/dc converters.

It is another object of the present invention to provide pulse width modulated (PWM) resonant dc/dc converters by using phase-shift control within the inverter.

It is a further object of the present invention to provide PWM resonant dc/dc converters including a series and a parallel resonant circuit.

It is a further object of the present invention to provide a resonant dc/dc converter with near zero turn-on, turn-off, and snubber losses while operating at constant and very high frequency.

SUMMARY OF THE INVENTION

Briefly stated, the present invention is directed to a constant frequency full resonant mode dc/dc converter which comprises a full bridge inverter, a resonant circuit means connected to the full bridge inverter, a transformer connected to the resonant circuit means, and a rectifying circuit means connected to the transformer. The resonant circuit means includes a parallel resonant branch which has a parallel inductor and a parallel capacitor, and a series resonant branch which has a series inductor.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS

A large number of resonant mode dc/dc converter topologies have been reported in the literature. However, it has been shown, for example, in the aforementioned articles that the series-parallel resonant converter is most suitable for applications with low voltage, high current regulated dc outputs.

Figure 1:
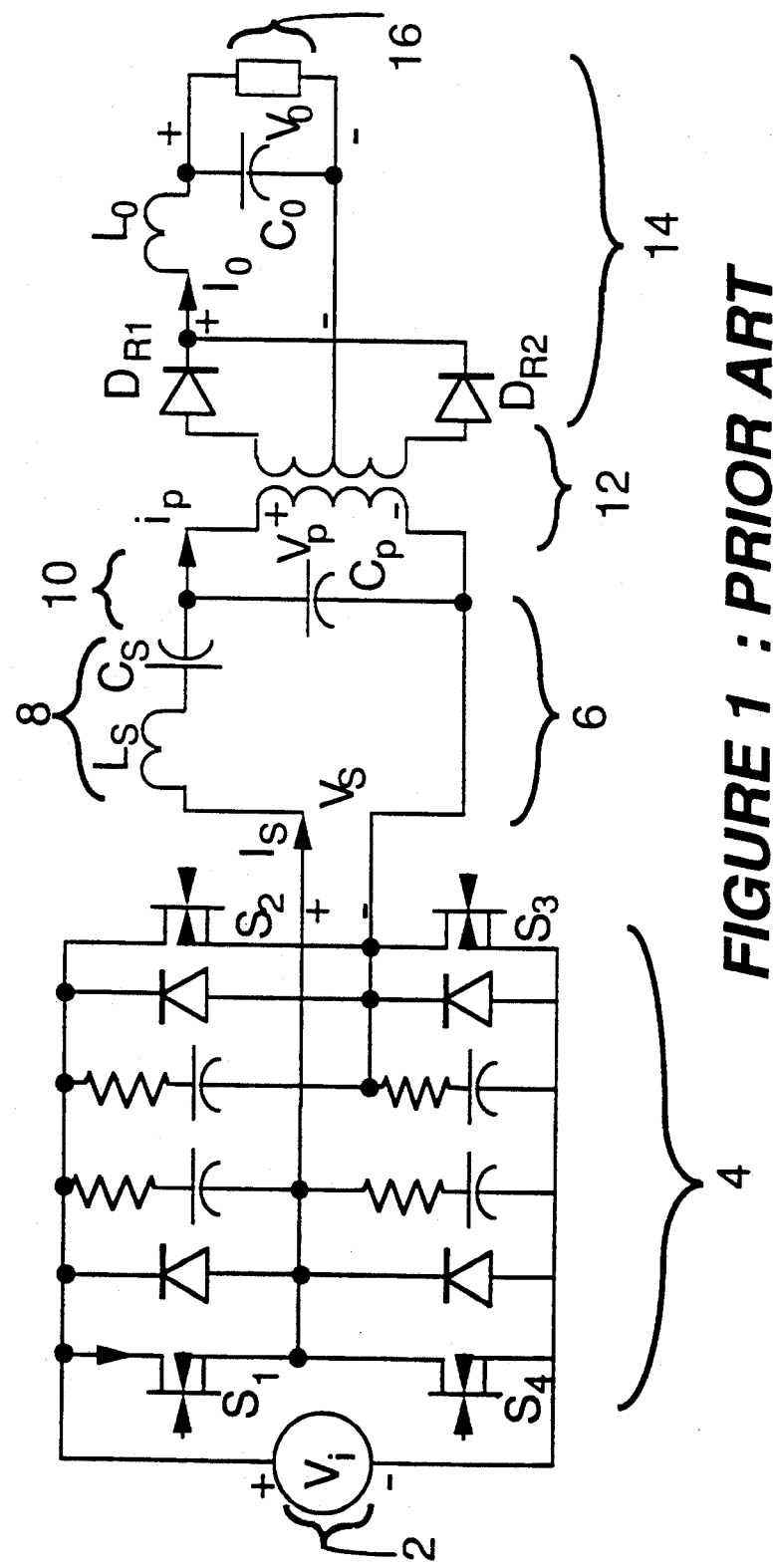
FIG. 1 is a diagrammatic illustration of a prior art dc/dc converter.

FIG. 1 illustrates diagrammatically such a known dc/dc converter circuit. In the figure, a dc voltage source 2 supplies the power to a full-bridge inverter 4 whose output, voltage $V_s$ and current $I_s$ is fed to a resonant circuit means 6. The resonant circuit means consists of a series resonant branch 8 and a parallel resonant branch 10. A transformer 12 is connected to the resonant circuit means. The secondary windings of the transformer is provided with a full-wave rectifying circuit means 14 which feeds its output to a load 16.

It has been well known that the full-bridge inverter contains switching elements, e.g. FETs $S_1$, $S_2$, $S_3$ and $S_4$ and their parallel or anti-parallel diodes. Snubber capacitors and resistors are also provided across their respective switching elements. The full-wave rectifying circuit means includes rectifying diodes and a filter consisting of a capacitor and an inductor.

In the circuit shown, the output voltage of the converter can be regulated by varying either (a) switching frequency of the converter with respect to the resonant frequency at constant pulse width, or (b) pulse width of the converter at constant switching frequency. Between the two, it has been shown that the pulse width modulation (PWM) at constant switching frequency performs better than the variable frequency method, particularly in systems with frequency locking requirement. However, the PWM method also has the following disadvantages:

(1) turn-on losses (for either switches $S_1$ and $S_4$ or switches $S_2$ and $S_3$) and turn-off losses (for either switches $S_2$ and $S_3$ or switches $S_1$ and $S_4$) are present which are dominant at higher operating frequencies;

(2) lossy snubbers are required across switches $S_1$ through $S_4$. These losses increase as the operating frequency of the converter is increased;

(3) either pair of switches $S_1$ and $S_4$ or $S_2$ and $S_3$ experience high di/dt and dv/dt switching stresses; and (4) fast recovery diodes are required across either pair of switches $S_2$ and $S_3$ or $S_1$ and $S_4$.

All the above disadvantages of the pulse width modulation limit the operation of the converter at medium frequencies (up to approximately 40 kHz).

Figure 2:
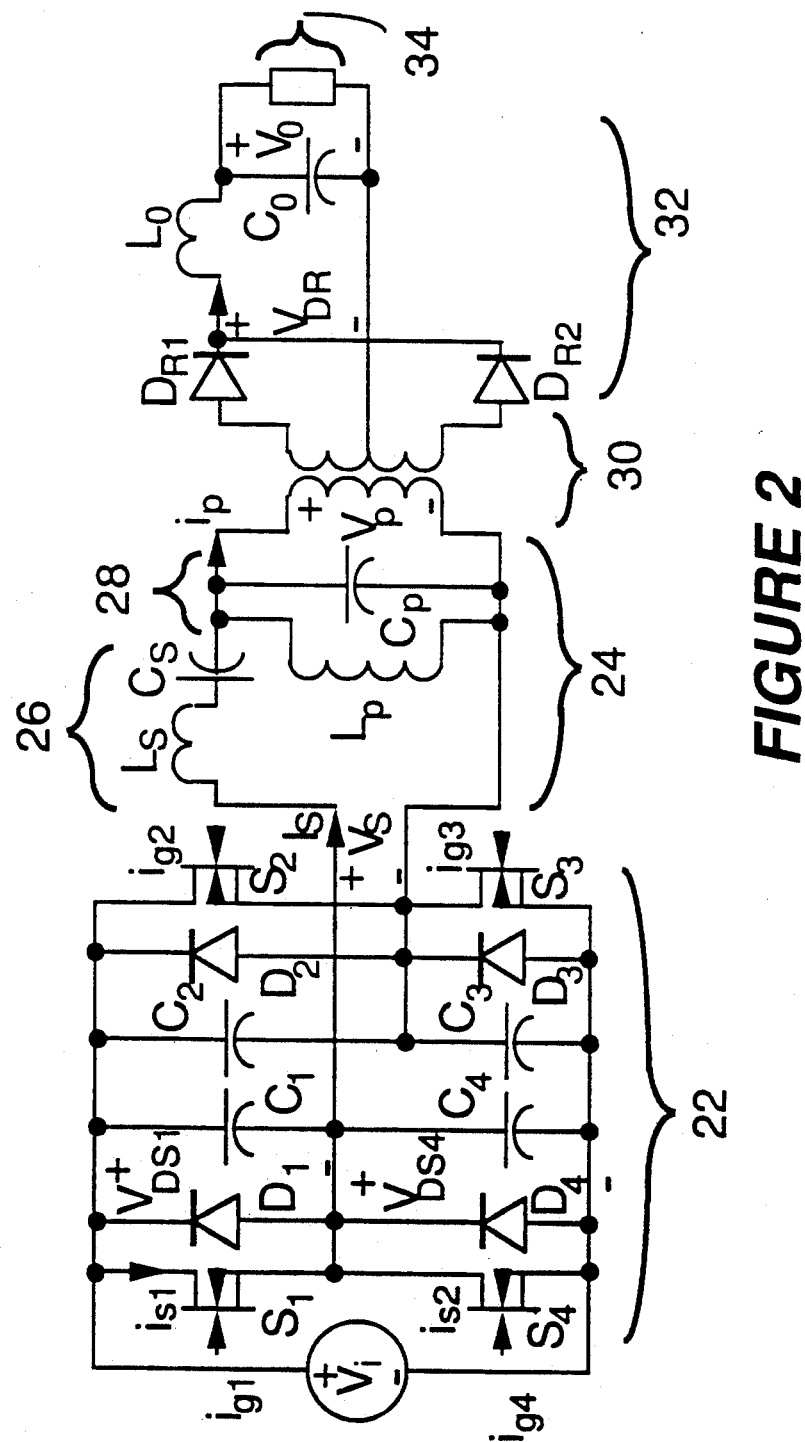
FIG. 2 is a diagrammatic illustration of a resonant dc/dc converter according to one embodiment of the present invention.

Referring to FIG. 2, one of the preferred embodiments is diagrammatically illustrated. The full-bridge inverter 22 contains four switches ($S_1$ to $S_4$), four diodes ($D_1$ to $D_4$) and four snubber capacitors ($C_1$ to $C_4$). In this embodiment, high frequency MOSFET switches are employed for $S_1$ to $S_4$ and no external diode is required across the switch as body diodes of the MOSFETs serve the function for $D_1$ to $D_4$. The function of this bridge is to convert dc input voltage to high frequency quasi-square waveform voltage $V_s$ at its own output.

The resonant circuit means 24 consists of a series branch 26 and a parallel branch 28. The series and parallel branches of the resonant circuit means each comprise an inductor and a capacitor. Thus, a series capacitor $C_s$ and a series inductor $L_s$ are in series in the series branch and a parallel capacitor $C_p$ and a parallel inductor $L_p$ are in parallel in the parallel branch. The components of the resonant circuit means are selected so that a close-to-sinusoidal voltage waveform $V_p$ across the parallel branch, and a near-sinusoidal current waveform $I_s$ with lagging power factor through the series branch is obtained.

The high frequency transformer 30 provides matching and isolation for the output voltage of the converter. The rectifying circuit means 32 includes rectifying diodes $D_{R1}$ and $D_{R2}$, and a filter consisting of an inductor $L_o$ and capacitor $C_o$ so that an essentially ripple-free dc output voltage $V_o$ is applied to the load 34.

In another embodiment, the parallel inductor $L_p$ of the parallel branch of the resonant circuit can be included as an integral part of the high frequency transformer 30 by adjusting the parameters of the transformer, such as air gap, turns, etc.

In this converter, a high frequency quasi-square voltage waveform is produced at the output of the full-bridge inverter 22 using phase-shift control within the inverter. The components of the series branch are tuned to the operating frequency so that this branch provides a zero impedance at the fundamental operating frequency. The components of the parallel branch are off-tuned such that this branch provides an effective inductive impedance at the fundamental operating frequency.

The application of the high frequency quasi-square voltage waveform across the combination of series and parallel branches results in a near-sinusoidal current waveform with lagging power factor through the series branch and a close-to-sinusoidal voltage waveform across the parallel branch. Voltage and current wave shaping obtained in this way achieves the following:

a) load-independent output voltage resulting in a narrow range of phase-shift control;

b) maximum voltage gain of the converter resulting in lower conduction losses;

c) turn-on and turn-off of the MOSFET switches under zero voltage, resulting in near zero switching losses;

d) loss-less snubbers across the switches;

e) elimination of Miller's effect, resulting in lower gate drive current and losses at MOSFET switches;

f) maximum duty cycle (50%) for each rectifying diode of the output rectifying circuit means, resulting in a lower value of the output filter inductor; and g) low voltage stress across the output rectifying diode, resulting in the use of schottky diode with lower forward voltage drop and hence conduction losses.

The sinusoidal voltage waveform $V_p$ across the parallel branch also appears at the primary winding of the transformer 30. The rectification action of the output rectifying diodes converts this sinusoidal voltage waveform into unidirectional output voltage waveform $V_{DR}$ at the output of the output filter. The required voltage is now filtered by the output filter to provide a low ripple output dc voltage $V_o$. The output voltage of the converter is maintained constant at a desired level against any variation in input voltage and output load by controlling the phase shift angle of the converter. This converter performs at the operating frequency up to several hundred kHz.

Figure 3:
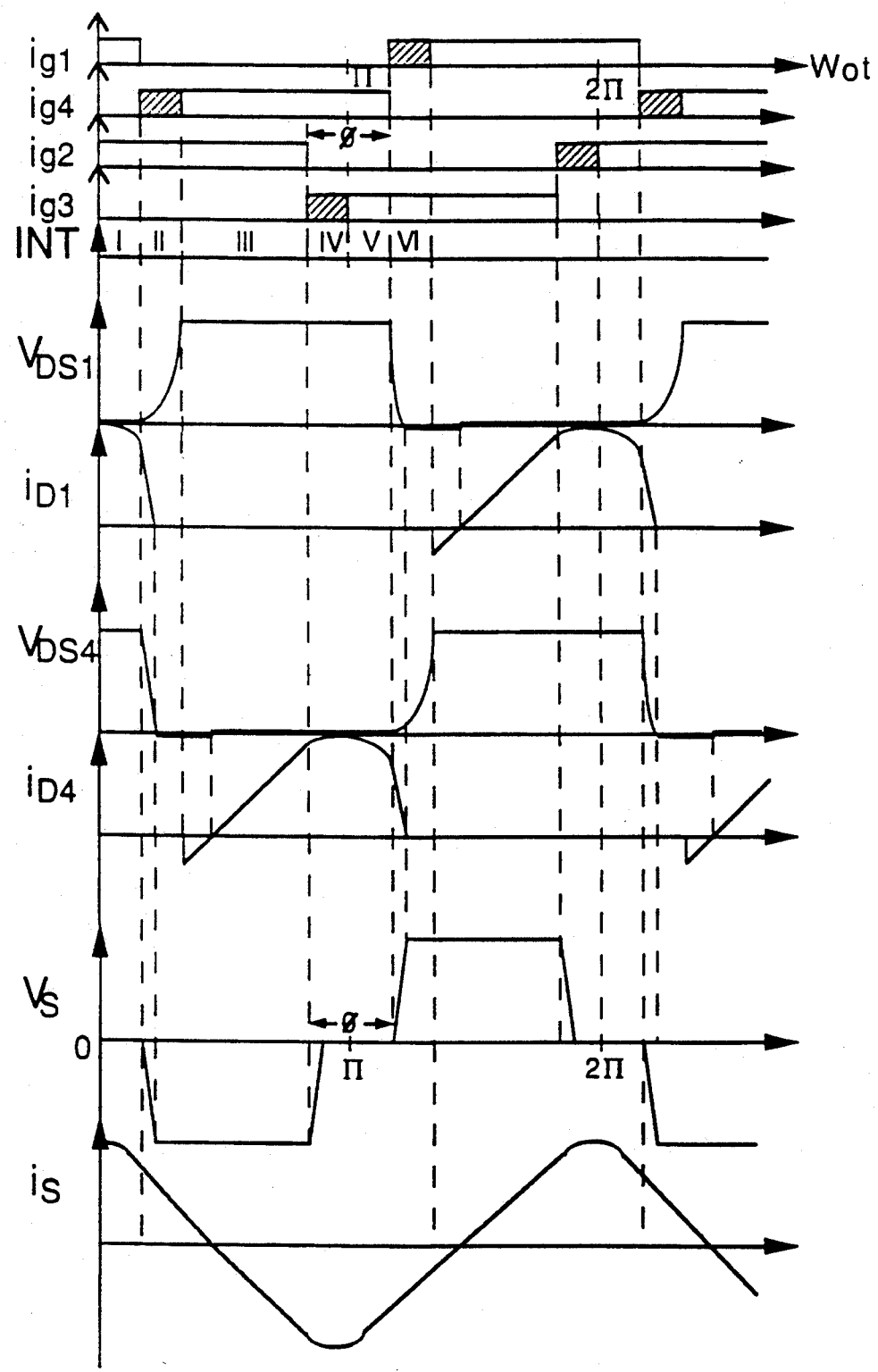
FIGS. 3(a) and 3(b) are graphs showing various waveforms to signals on a corresponding time scale.
Figure 3:
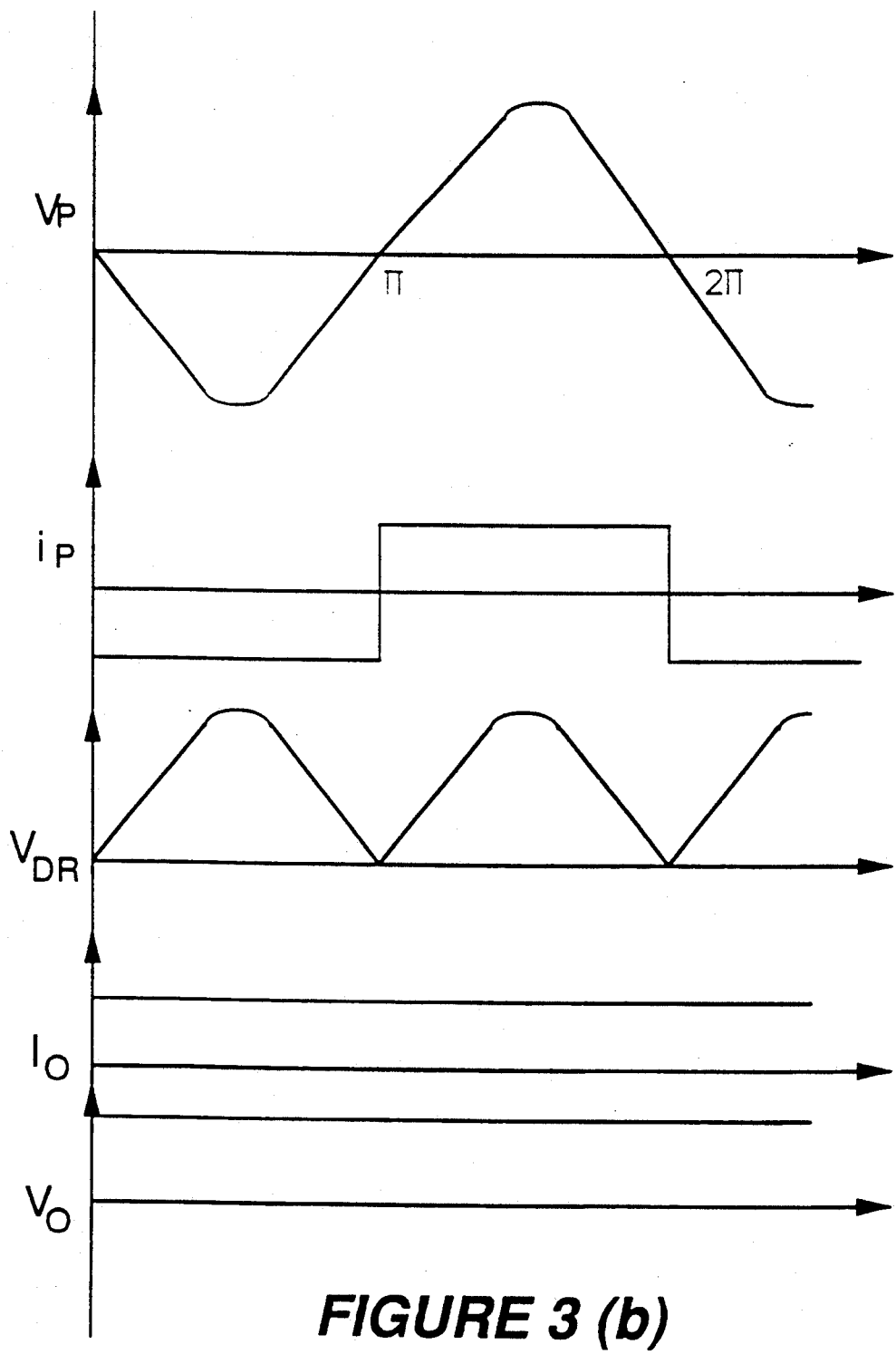

A description of the operation of the dc/dc converter shown in FIG. 2 will now be given with reference to FIG. 3.

For a steady-state cycle, there exists eight distinct intervals in which the converter of FIG. 2 operates. For each interval, the operation of the converter is described below, where gating signals $i_{g1}$, $i_{g2}$, $i_{g3}$ and $i_{g4}$ are control signals applied to the gates of the MOSFET switches $S_1$, $S_2$, $S_3$ and $S_4$ respectively.

Interval I

During this interval, MOSFET switches $S_1$ and $S_2$ are conducting and carrying the positive resonant current $I_s$. Simultaneous conduction of $S_1$ and $S_2$ provides a zero voltage interval for the output voltage of the inverter ($V_s$). The zero voltage interval is needed to control power flow from the input to the output in order to regulate and/or vary the output DC voltage.

Interval II

At the beginning of this interval, gating signal $i_{g1}$ applied to the gate of switch $S_1$ has been removed. Switch $S_1$ starts to turn-off, and the snubber capacitor $C_1$ starts to charge. At the same time, because of the positive resonant current $I_s$, the snubber capacitor $C_4$ across switch $S_4$ starts to discharge to the resonant circuit. Once voltage across the snubber capacitor $C_4$ reaches zero, the positive resonant current force's anti-parallel diode $D_4$ across switch $S_4$ to conduct. Simultaneous conduction of diode $D_4$ and switch $S_2$ provides a negative voltage $V_s$ at the output of the inverter. Since energy stored in the snubber capacitor is discharged to the resonant circuit, a larger value of the snubber capacitor $C_1$ is employed to provide a slow rise of the voltage across switch $S_1$. This ensures a close to zero turn-off loss in the switch.

Interval III

At the beginning of this interval, gating signal $i_{g4}$ has been applied at the gate of switch $S_4$. The resonant current $I_s$ is now transferred to switch $S_4$ from anti-parallel diode $D_4$. Since diode $D_4$ was conducting prior to the conduction of switch $S_4$, turn-on of switch $S_4$ is, therefore, obtained under zero voltage. This results in zero turn-on loss for the switch. During this interval, switches $S_2$ and $S_4$ conduct and a negative voltage $V_s$ appears at the output of the inverter. In this interval, power flows from input DC source to the resonant circuit.

Interval IV

At the beginning of this interval, gating signal $i_{g2}$ from the gate of switch $S_2$ has been removed. Switch $S_2$ starts to turn-off, and the snubber capacitor $C_2$ starts to charge. At the same time, because of the negative resonant current $I_s$, the snubber capacitor $C_3$ across switch $S_3$, starts to discharge to the resonant circuit. Once voltage across snubber capacitor $C_3$ reaches zero, the negative resonant current forces anti-parallel diode $D_3$ to conduct. Simultaneous conduction of switch $S_4$ and anti-parallel diode $D_3$ provides a zero voltage interval for the inverter output voltage $V_s$. A large value of snubber capacitor $C_2$ across switch $S_2$ provides a slow rise of voltage across switch $S_2$, thereby eliminating turn-off loss in the switch.

Interval V

At the beginning of this interval, gating signal $i_{g3}$ has been applied at the gate of switch $S_3$. The resonant current $I_s$ is now transferred to switch $S_3$ from anti-parallel diode $D_3$. Since diode $D_3$ was conducting prior to the obtained under zero voltage which results in zero turn-on loss for the switch. During this interval, switches $S_4$ and $S_3$ are conducting and providing a zero voltage interval for the inverter output voltage $V_s$.

Interval VI

At the beginning of this interval, gating signal $i_{g4}$ from the gate of switch $S_4$ has been removed. Switch $S_4$ starts to turn-off and snubber capacitor $C_4$ starts to charge. At the same time, because of negative resonant current $I_s$, the snubber capacitor $C_1$ across switch $S_1$ starts to discharge to the resonant circuit. Once voltage across snubber capacitor $C_1$ reaches to zero, the negative resonant current forces anti-parallel diode $D_1$ to conduct. Simultaneous conduction of diode $D_1$ and switch $S_3$ provides a positive voltage $V_s$ at the output of the inverter. A large value of snubber capacitor $C_4$ provides a slow rise of voltage across switch $S_4$, thereby eliminating turn-off loss in the switch.

Interval VII

At the beginning of this interval, signal $i_{g1}$ has been applied at the gate of switch $S_1$. The resonant current $I_s$ is now transferred to switch $S_1$ from anti-parallel diode $D_1$. Since diode $D_1$ was conducting prior to the conduction of switch $S_1$, turn-on of switch $S_1$ is achieved under zero voltage, thereby eliminating turn-on loss for the switch. During this interval, switches $S_1$ and $S_1$ are conducting and providing a negative voltage $V_s$ at the output of the inverter.

Interval VIII

At the beginning of this interval, gating signal $i_{g3}$ from the gate of switch $S_3$ has been removed. Switch $S_3$ starts to turn-off, and snubber $C_3$ starts to charge. At the same time, because of positive resonant current $I_s$, the snubber capacitor $C_2$ starts to discharge to the resonant circuit. Once voltage across snubber capacitor $C_2$ reaches zero, the positive resonant current forces anti-parallel diode $D_2$ to conduct. Simultaneous conduction of switch $S_1$ and diode $D_2$ provides a zero voltage interval for the inverter output voltage $V_s$. A large value of snubber capacitor $C_3$ provides a slow rise of voltage across switch $S_3$, thereby eliminating turn-off loss in the switch.

At the position where $\Omega_o t = 2\tau$, $\Omega_o$ is the fundamental operating frequency in radian/second, gating signal $i_{g2}$ is applied at the gate of switch $S_2$. Switch $S_1$ and $S_2$ now conduct simultaneously and a new cycle begins.

The above description of the converter operation reveals that the switches are always turned-on and turned-off under near zero voltage, thereby eliminating the switching losses. Further, the snubber capacitors always discharge to the resonant circuit, which also eliminates the snubber losses. As can be seen in the above from the above discussion with reference to the operation of the converter, all this is possible because of the lagging nature of the resonant current $I_s$ and large values of snubber capacitors. The resonant circuit employed in this converter provides the desired type of output current $I_s$.

The table below shows efficiencies for the converter circuits of FIGS. 1 (prior art) and 2 (invention) as a function of operating frequency. As can be seen from this table, the efficiency of the converter circuit of FIG. 1 decreases as the operating frequency increases, while the efficiency of the converter circuit of FIG. 2 is independent of the operating frequency and is always higher than the other circuit. This gives the obvious advantages of the converter circuit of FIG. 2 over the converter circuit of FIG. 1 for high frequency operation in terms of higher power density and lower conversion losses.

| OPERATING FREQUENCY | EFFICIENCY | | OPERATING PARAMETERS |
|---|---|---|---|
| | PRIOR ART | INVENTION | |
| 25 kHz | 87.0% | 87.1% | Output |
| 50 kHz | 85.0% | 87.1% | Voltage = 5V |
| 100 kHz | 83.0% | 87.1% | Output Power = |
| 250 kHz | 76.3% | 87.1% | 500 W |
| 500 kHz | 67.2% | 87.1% | Input Volt- |
| 1000 kHz | 55.0% | 87.1% | age = 48V |

Figure 4:
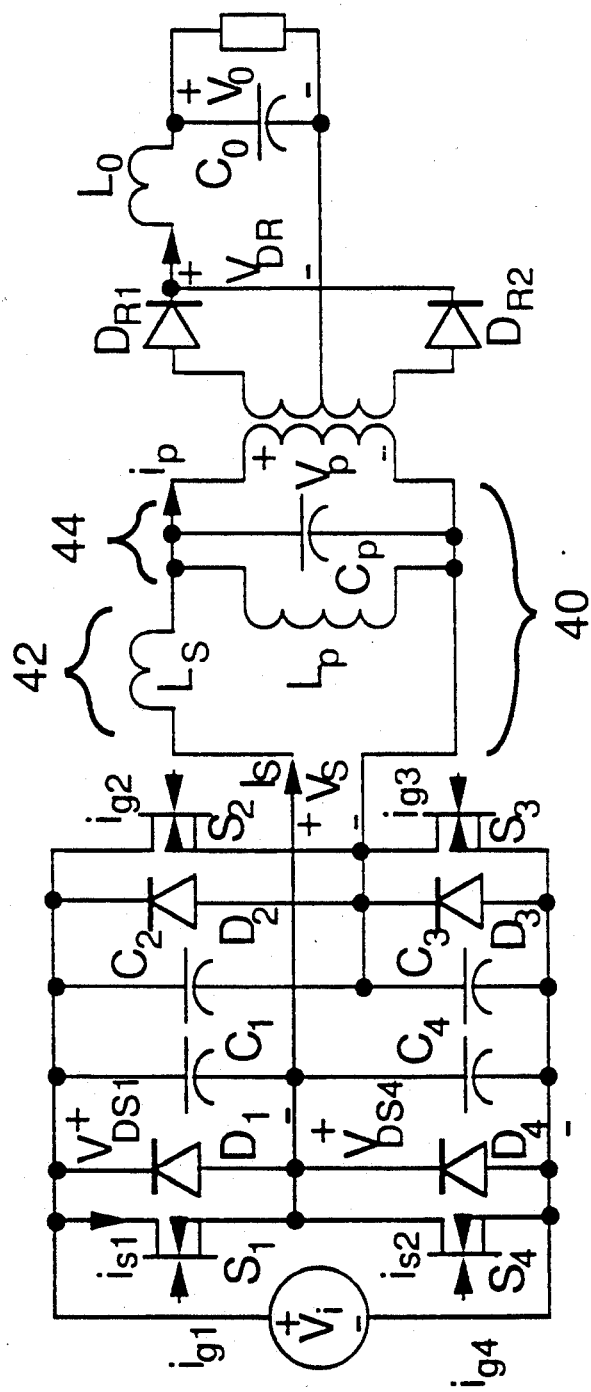
FIG. 4 is a diagrammatic illustration of a resonant dc/dc converter according to a further embodiment of the present invention.

Referring now to FIG. 4, a further embodiment of the present invention is diagrammatically illustrated. In this figure, the resonant circuit means 40 consists of a series branch 42 containing a series inductor $L_s$ and a parallel branch 44 containing a combination of a parallel inductor $L_p$ and a parallel capacitor $C_p$. The components of the parallel branch are selected such that they are tuned to the operating frequency of the converter. However, the value of the series inductor $L_s$ is chosen such that the resonant frequency of $L_s$ and $C_p$ is about 1.7 times the operating frequency of the converter. The series inductor $L_s$ has two functions: (a) it provides high impedances for harmonic components which are present in output voltage of the full-bridge inverter, and (b) it limits discharging from the parallel capacitor to the switches of the full-bridge inverter during zero voltage interval of the output voltage of the full-bridge inverter. The parallel inductor $L_p$ and parallel capacitor $C_p$ of the parallel branch also have two functions: (a) they provide a near-sinusoidal stiff voltage source across the output transformer, and (b) they allow the circulating current of the resonant circuit to be confined primarily within the parallel branch.

In this converter, a high frequency quasi-square voltage waveform is produced at the input of the resonant circuit means using phase-shift modulation within the inverter. This voltage contains fundamental and odd harmonic components. The series inductor $L_s$ of the series resonant branch offers a low impedance for the fundamental, and high impedances for the harmonic components of the output voltage. The parallel inductor $L_p$ and parallel capacitor $C_p$, which are tuned to the operating frequency, provide a high impedance for the fundamental, and low impedances for the harmonic components of the output voltage. Application of the high frequency quasi-square voltage waveform across the combination of series and parallel branches results in a resonant current waveform which has near exponentially rising and falling edges with lagging power factor through the series inductor and a near-sinusoidal voltage waveform cross the parallel branch. Voltage and current wave shaping obtained in this way achieves the following characteristics, in addition to some features discussed heretofor with respect to the embodiment shown in FIG. 2:

a) circulating currents are confined within the parallel branch, resulting in high converter efficiency from full-load to reduced-load; and b) turn-on and turn-off of the MOSFET switches under zero voltage over a wide range of phase-shift control, resulting in near zero switching losses.

It is therefore evident that the switches are always turned on and turned off under near zero voltage, thereby eliminating the switching losses. Further, the snubber capacitors always discharge to the resonant circuit, which also eliminates the snubber losses. In achieving near zero switching and snubber losses, shape of the output current waveform $I_s$ plays a major role. The nature of current $I_s$ should be such that it must force the anti-parallel diode across the switch to conduct before the switch can be turned on. This will ensure discharging of the snubber capacitors to the resonant circuit, and turn-on of the switches under zero voltage. As explained earlier, the components $L_p$ and $C_p$ of the parallel branch are tuned to the operating frequency. However, the value of the series inductor is chosen such that the resonant frequency of $L_s$ and $C_p$ is higher than the operating frequency of the converter.

Figure 5:
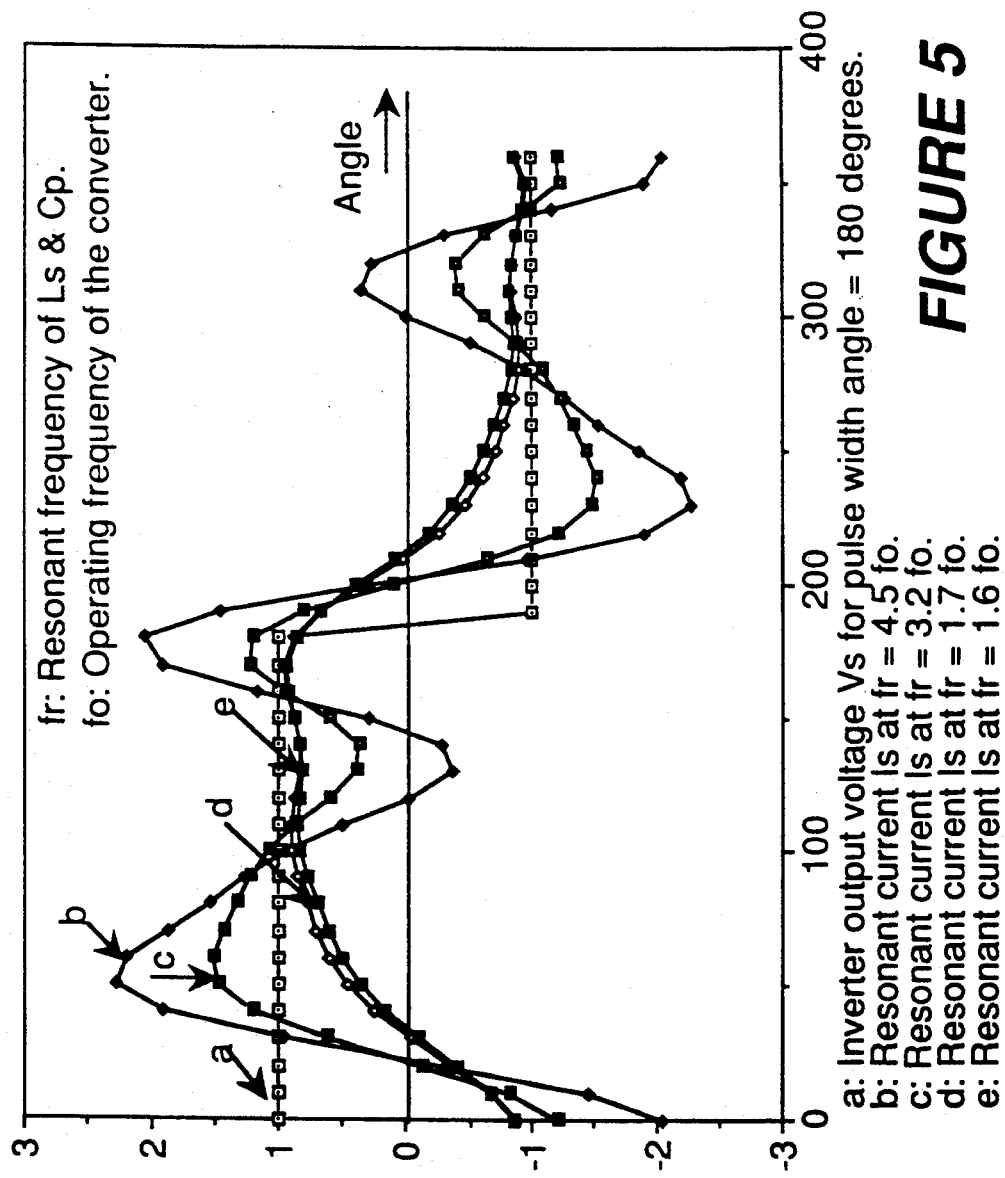
FIGS. 5 and 6 are graphs showing various waveforms of signals according to the embodiment shown in FIG. 4.
Figure 6:
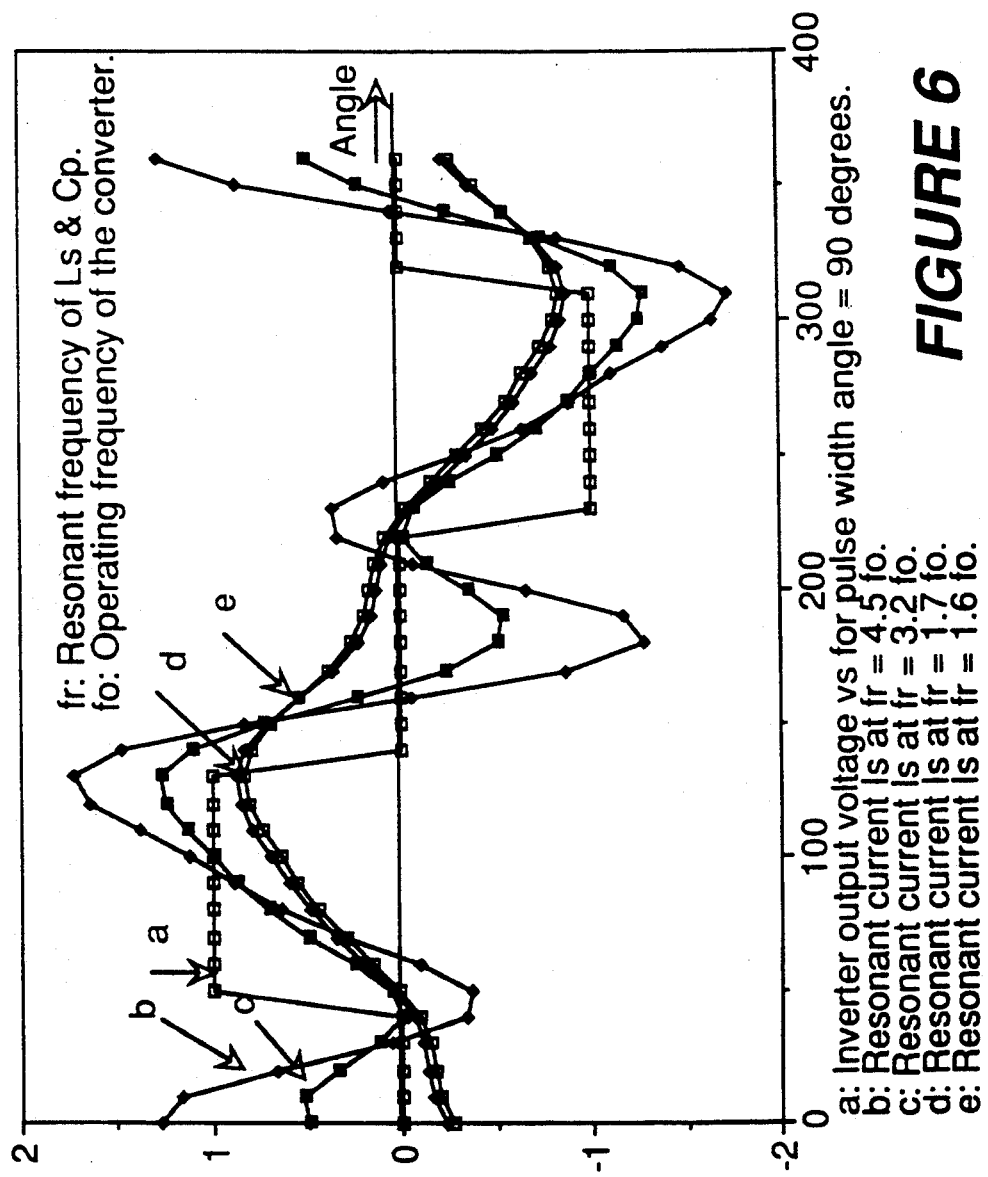

The resonant frequency of $L_s$ and $C_p$ has a significant effect on the shape of resonant current waveform $I_s$ as shown in FIGS. 5 and 6. As can be seen from these figures, depending on the values of the resonant frequency, the current $I_s$ may have multiple or single zero crossings in each half cycle. Over a wide range of control of the pulse width angle ($\delta$), the current waveform with multiple zero crossings does not always ensure conduction of the anti-parallel diode before the switch across it is turned on. Therefore, the resonant frequency of $L_s$ and $C_p$ should be such that the resultant output current waveform has only single zero crossing in each half cycle over a wide range of the angle $\delta$ control. Normally the resonant frequency of $L_s$ and $C_p$ is chosen about 1.7 times the operating frequency of the converter.

I claim:

1. A constant frequency full resonant mode dc/dc converter operating at a constant resonant operating frequency comprising;
    a full bridge inverter having a least four semiconductor switches to which control signal are applied and at least four snubber capacitors;
    a resonant circuit means connected to the full bridge inverter and comprising a parallel resonant branch which has a parallel inductor and parallel capacitor and is tuned to said operating frequency, and a series resonant branch having a series inductor which, together with said parallel capacitor, is tuned to a frequency different from said operating frequency;
    a transformer connected to said resonant circuit means in such a way that said series resonant branch is connected in series to said transformer and said parallel resonant branch is connected in parallel to said transformer; and
    a rectifying circuit means connected to said transformer wherein the phase shift angle among said control signals is adjustable to maintain the output voltage of said converter constant.

2. The constant frequency full resonant mode dc/dc converter according to claim 1, wherein said snubber capacitors and said resonant circuit means are chosen as to their values with respect to said operating frequency so that a resonant current waveform having near exponentially rising and falling edges with a lagging power factor is applied through said series inductor and a near-sinusoidal voltage waveform is applied across said parallel branch.

3. The constant frequency full resonant mode dc/dc converter according to claim 2, wherein said parallel resonant branch is tuned to said operating frequency and the value of said series inductor is chosen so that the resonant frequency of said series inductor and said parallel capacitor is about 1.7 times said operating frequency.

4. The constant frequency full resonant mode dc/dc converter according to claim 3, wherein said full bridge inverter further comprises at least four diodes and said semiconductor switches are MOSFETs.

* * * * *